United States Patent [19]

Enzinna

[11] Patent Number: 5,555,421
[45] Date of Patent: Sep. 10, 1996

[54] BIDIRECTIONAL INTERFACE FOR INTERCONNECTING TWO DEVICES AND THE INTERFACE HAVING FIRST OPTICAL ISOLATOR AND SECOND OPTICAL ISOLATOR BEING POWERED BY FIRST AND SECOND DEVICE PORTS

[75] Inventor: Donald J. Enzinna, Lockport, N.Y.

[73] Assignee: Kistler Instrument Company, Amherst, N.Y.

[21] Appl. No.: 155,816

[22] Filed: Nov. 23, 1993

[51] Int. Cl.$^6$ ...................................... H04B 9/00
[52] U.S. Cl. .................. 395/750; 359/154; 364/228.5; 364/260.4; 364/260.9; 364/DIG. 1
[58] Field of Search ..................... 395/200, 275, 395/800, 550, 750; 359/154, 157, 159, 180, 189

[56] References Cited

U.S. PATENT DOCUMENTS

| | | | |
|---|---|---|---|
| 3,790,791 | 2/1974 | Anderson | 250/238 |
| 3,792,284 | 2/1974 | Kaelin | 250/551 |
| 3,878,397 | 4/1975 | Robb et al. | 250/551 |
| 4,079,272 | 3/1978 | Howatt | 327/205 |
| 4,105,966 | 8/1978 | Lennon et al. | 324/113 |
| 4,161,650 | 7/1979 | Caouette et al. | 359/171 |
| 4,176,401 | 11/1979 | Lonberger | 250/551 |
| 4,233,589 | 11/1980 | Rawson et al. | 359/173 |
| 4,313,225 | 1/1982 | Carbrey et al. | 359/152 |
| 4,363,121 | 12/1982 | Schlyter | 370/24 |
| 4,417,099 | 11/1983 | Pierce | 379/98 |
| 4,420,841 | 12/1983 | Dudash | 359/113 |
| 4,435,764 | 3/1984 | El-Gohary | 395/800 |
| 4,485,439 | 11/1984 | Rothstein | 395/500 |
| 4,507,571 | 3/1985 | Callan | 327/184 |
| 4,595,839 | 6/1986 | Braun et al. | 250/551 |
| 4,596,984 | 6/1986 | Egami | 307/117 |
| 4,639,727 | 1/1987 | Blasius et al. | 359/176 |
| 4,750,216 | 6/1988 | Boyce | 359/154 |
| 5,119,482 | 6/1992 | Lloyd | 395/307 |
| 5,121,491 | 6/1992 | Sloan et al. | 395/500 |
| 5,157,769 | 10/1992 | Eppley et al. | 395/200.01 |
| 5,179,710 | 1/1993 | Coschieri | 395/750 |
| 5,406,091 | 4/1995 | Burba et al. | 359/136 |

*Primary Examiner*—Thomas C. Lee
*Assistant Examiner*—Moustafa Mohamed Meky
*Attorney, Agent, or Firm*—Barnes & Thornburg

[57] ABSTRACT

An interface having two optical isolators which produce bidirectional communication interfaces between first and second devices. The first device provides positive, negative and neutral ports to its portion of the interface. The second device provides first and second power ports for its portion of the interface. The power ports are independent of the signals or data inputs and outputs of the interface and are used to power their portion of the interface and define the two levels of signals necessary at each output of the interface. The positive and negative ports of the interface are from the first device which preferably is a computer and are signals provided on unused data or control signal ports. The interface may be incorporated into the second or non-computer device.

9 Claims, 3 Drawing Sheets

BIDIRECTIONAL INTERFACE FOR INTERCONNECTING TWO DEVICES AND THE INTERFACE HAVING FIRST OPTICAL ISOLATOR AND SECOND OPTICAL ISOLATOR BEING POWERED BY FIRST AND SECOND DEVICE PORTS

BACKGROUND AND SUMMARY OF THE INVENTION

The present invention relates generally to electro-optical interfaces and more specifically to a self-powered electro-optical interface.

Serial interfaces, and particularly serial interfaces conforming to the RS-232C standard are a popular interface between personal computers and remote equipment. This equipment includes modems, mice, printers and more recently, various types of measuring instruments. One problem which arises when a computer is used with a measuring instrument, especially an instrument which measures low levels or sensitive signal levels, is noise. Under extreme circumstances, noise may completely mask the measured signal or cause overload in the measuring instrument. It is common for noise to be development due to ground loops. A ground loop occurs when a voltage or potential difference exists between the ground at the instrument and ground at the computer. It is possible, for instance, to connect the instrument to one ground point and a computer to another, such as is possible if the two are not in proximity to each other.

Further, if large electrical loads are present on the building's electrical system, the local grounds will be at slightly different electrical potentials. Since the RS-232 interface requires a signal common or ground to operate, a current will flow along the interface ground wire. The building's ground wire will act as both a return path and as a coupling medium. Since the building ground wire is commonly run alongside the wires carrying current to the large load, magnetic fields will couple energy into the ground wire much the same way as a transformer. Problems which will arise include signal degradation or erratic interface operation.

One common way to reduce noise under these circumstances is to couple the interface signals over a device which allows for the galvanic separation of two ground systems. One common device is an opto-coupler. The use of an opto-coupler has heretofore required external power to operate the devices and any other required interface circuitry. This has previously required the added expense of a transformer or batteries. Some examples of prior art devices are described hereafter.

U.S. Pat. No. 4,161,650 to Caouette, et al. shows a self-powered fiber optic interconnected system. The circuitry in FIG. 3 derives its power for the interface from the incoming electrical signals and transmits this electrical power over line 45 to the other interface in parallel to the optically transmitted signals.

U.S. Pat. No. 4,417,099 to Pierce shows an electro-optical isolator circuit for line powered modems. Multiplexer 32, interface 20 and data buffer 18 each include the electro-optical isolator of FIG. 2. The telephone line interface and power device 10 derives the operating power from the telephone line to all modem circuits.

U.S. Pat. No. 4,420,841 to Dudash shows optically coupled half duplex bidirectional transceiver. A test instrument 12 is isolated from micro-processor based encoder 20 by optical isolators 16, 18; 24, 38; and 30, 32. Separate power sources V1, V2 and V3 are provided to various portions of the transceiver 110.

U.S. Pat. No. 4,485,439 to Rothstein shows a sophisticated interface circuit for connecting an instrument with a host digital computer. The instrument 102 may provide data in various physical formats such as synchronous or asynchronous RS-232, or passive or active current loop, or discrete digital TTL signals. The three types of physical compatibility translator elements 300, 302 and 304 are illustrated for the V.24 RS-232 mode, current loop active mode and current loop passive mode respectively. FIGS. 4 and 5 show electro-optical isolators. A power source 126 is shown in the interface device.

U.S. Pat. No. 4,639,727 to Blasius, et al. shows optical couplers for interfacing RS-232s ±12 volts over cable 2 with an RS422 0 to +5 volts over wire 4.

U.S. Pat. No. 5,121,491 to Sloan, et al. shows an interface between MIDI to RS-232 using electro-optical couplers. Power convertor 37 receives the data terminal release DTR signal from pin 20 of the host computer 9 and uses it as a source of power and for power regulation. This allows the 5 volt signal from the MIDI to be provided to an appropriate level for the computer 9 based on the signal level at DTR Pin 20. The signal is also used to enable and disable the interface.

U.S. Pat. No. 5,157,769 to Eppley, et al. shows an interface between a host computer and a second computer. The interface is designed to interface a 3–6 volts system and a ±12 volts system. As illustrated in FIG. 3, the power for the interface is from data out pin 2 of the host computer. An optical isolator 52 activates and deactivates the ground pin of the smaller device. Thus, the smaller device is not powered-up unless there is a signal on terminal 20 of the host computer. Amplifier 40 provides the interface from the smaller device to the host computer, and transistor 44 provides the interface between the host computer and the smaller device.

These previous devices have not provided an inexpensive interface which is readily available to many situations for example interconnecting a computer having its own power source with a device also having some power source.

Thus it is an object of the present invention to provide an inexpensive isolating interface between two devices wherein one of the devices is a computer.

Another object of the present invention is to provide an isolating interface which is capable of being incorporated into a device which communicates with a computer.

A further object of the present invention is to provide an interface with no independent power source which is capable of interfacing a RS-232 buss with a TTL level buss.

These and other objects are achieved by providing two optical isolators in an interface which produce bidirectional communication interfaces between first and second devices. The first device provides positive, negative and neutral ports to its portion of the interface. The second device provides first and second power ports for its portion of the interface. The power ports are independent of the signals or data inputs and outputs of the interface and are used to power their portion of the interface and define the two levels of signals necessary at each output of the interface. Capacitors are provided between the positive, negative and neutral ports for establishing reference values. The positive and negative ports of the interface are from the first device which preferably is a computer and are signals provided on unused data or control signal ports. The interface may be incorporated into the second or non-computer device.

Other objects, advantages and novel features of the present invention will become apparent from the following detailed description of the invention when considered in conjunction with the accompanying drawings.

DETAILED DESCRIPTION OF THE DRAWINGS

Figure 1:
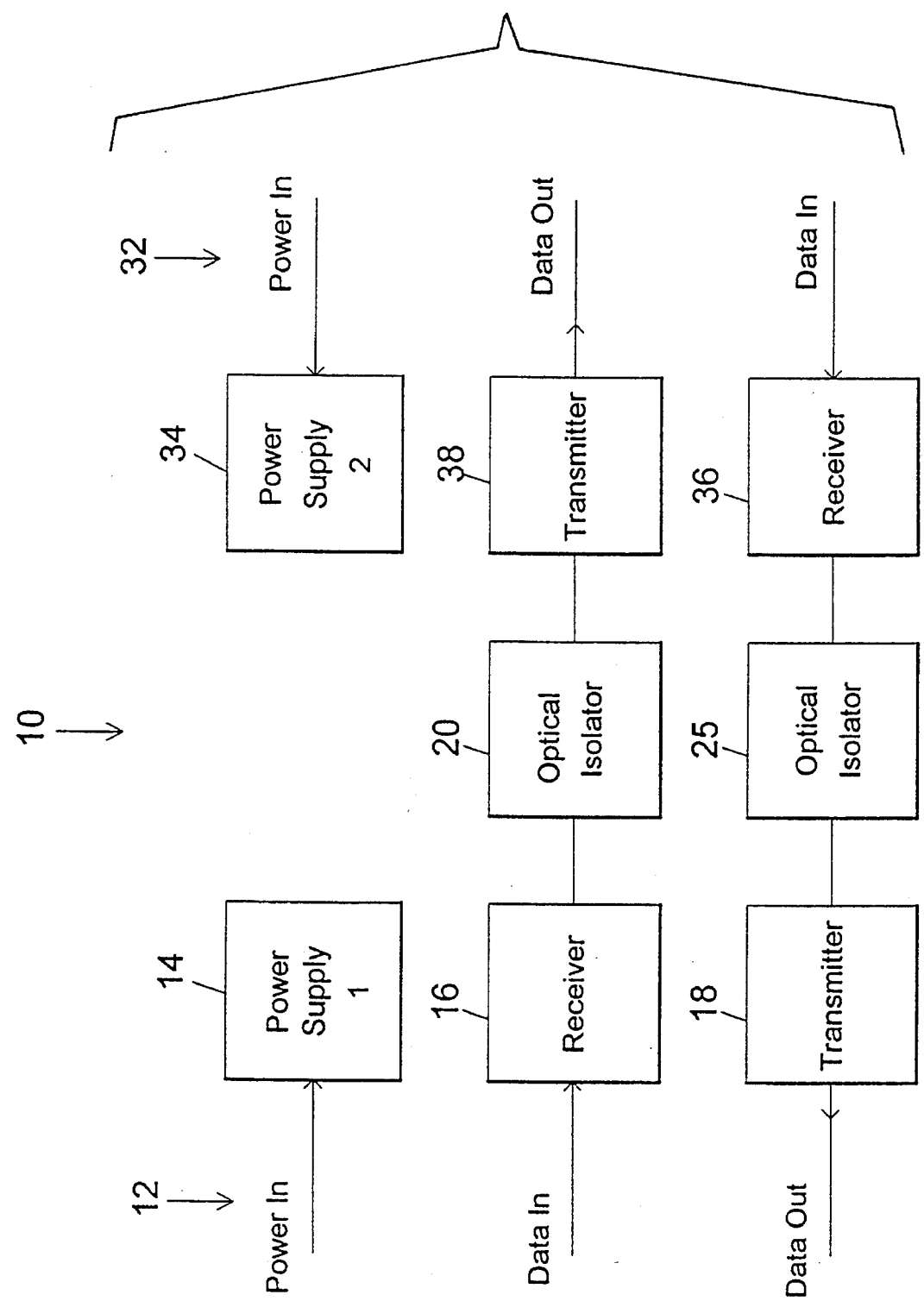
FIG. 1 is a blocked diagram of an interface according to the principals of the present invention.

As illustrated in FIG. 1, an interface 10 includes a first terminal 12 which has power in, data in, and data out ports connected respectfully to a first power supply 14, a receiver 16 and a transmitter 18. A second terminal 32 has power in, data out and data in ports connected respectively to the power supply 34, transmitter 38 and receiver 36. Receiver 16 and transmitter 38 are connected by an optical isolator 20 and transmitter 18 and receiver 36 are connected by optical isolator 25.

Power supplies 14 and 34 contain means for energy storage, regulation and any form of electrical protection for the interface 10. The power supplies 14, 34 take energy from the communicating devices at terminals 12 and 32 and must each provide sufficient energy for operating the transmitters 18, 38 and receivers 16, 36 on the appropriate side of the interface. In addition, the power supplies 14, 34 must each be capable of operating the light emitting diode and photo transistors inside the optical isolators 20 and 25. The power supplies 14, 34 set the signal level of the output signal from transmitters 18 and 38 at the appropriate communicating device levels.

The receivers 16, 36 contain all the circuitry for converting the serial interface signals at the data in ports into the drive current for the light emitting diodes of optical isolators 20, 25. The transmitters 18, 38 must convert the photo currents of the transistors in the optical isolators 20, 25 into logic levels which are compatible with the receivers in each communicating device on terminals 12, 32. There is complete electrical isolation between each side of the interface 10. One application of the interface 10 is between a computer and a measuring instrument. The electrical isolation permits the galvanic separation of the two electrical grounding systems. Although the interface 10 may be physically located inside the instrument, a second power supply in the instrument is not required since the computer provides power to its portion of the interface. This lowers the overall system cost.

In the preferred embodiment, the instrument side 12 of the interface has logic levels of +5 Volts and Ground, generally known in the art as TTL levels. These levels represent a logic one and zero respectively and are chosen since they are directly compatible with the micro controller used on the measuring instrument. The computer side of the interface 32 uses logic levels of −10 and +10 volts which represent logic one and zero respectively. These levels are generally known as RS-232 after the EIA specification by that title.

Figure 2:
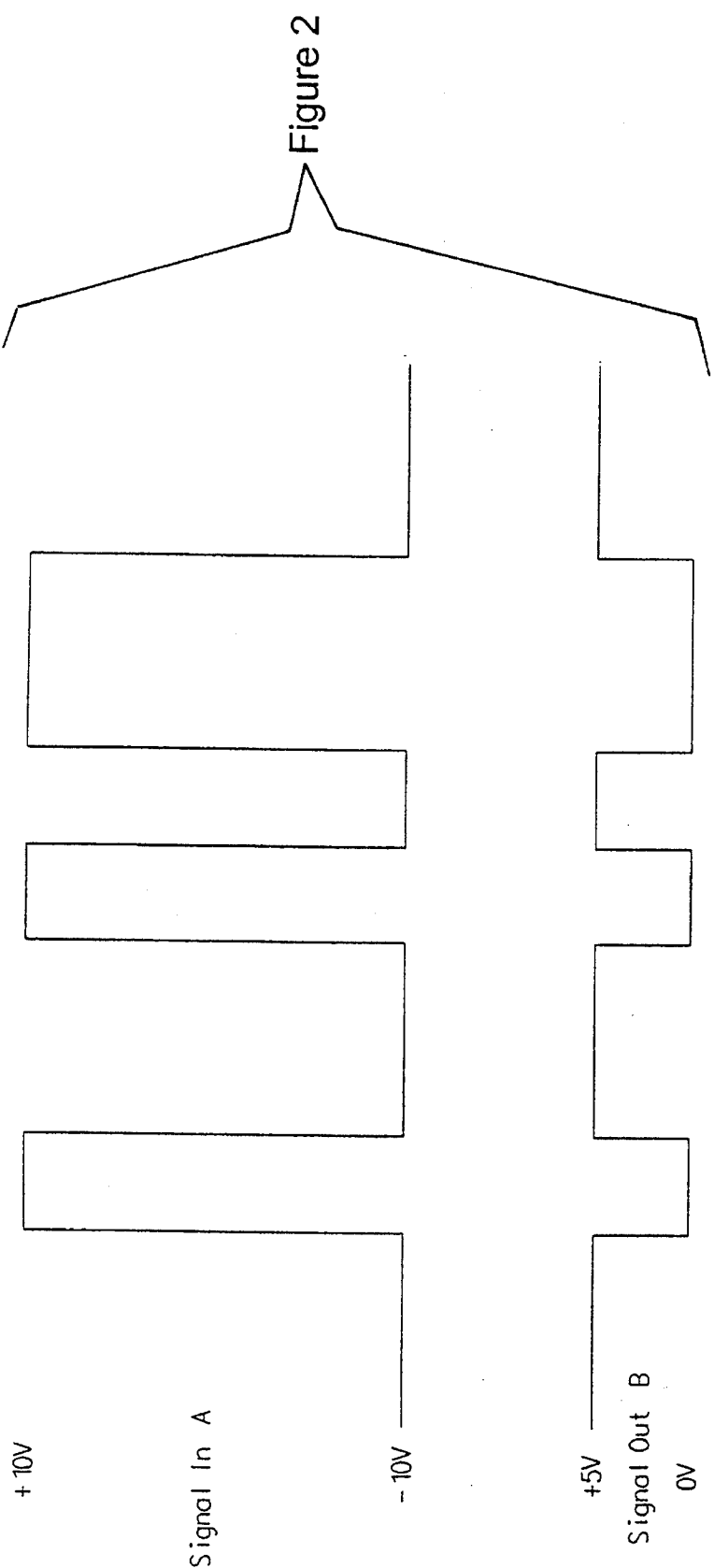
FIG. 2 shows graphs of RS-232 input signal and TTL output signals respectively.

FIG. 2 shows a typical RS-232 waveform in graph A and a TTL wave form in graph B. Note the inversion of signal polarity which is required and provided by judicious choice of transmitter circuitry 38.

Figure 3:
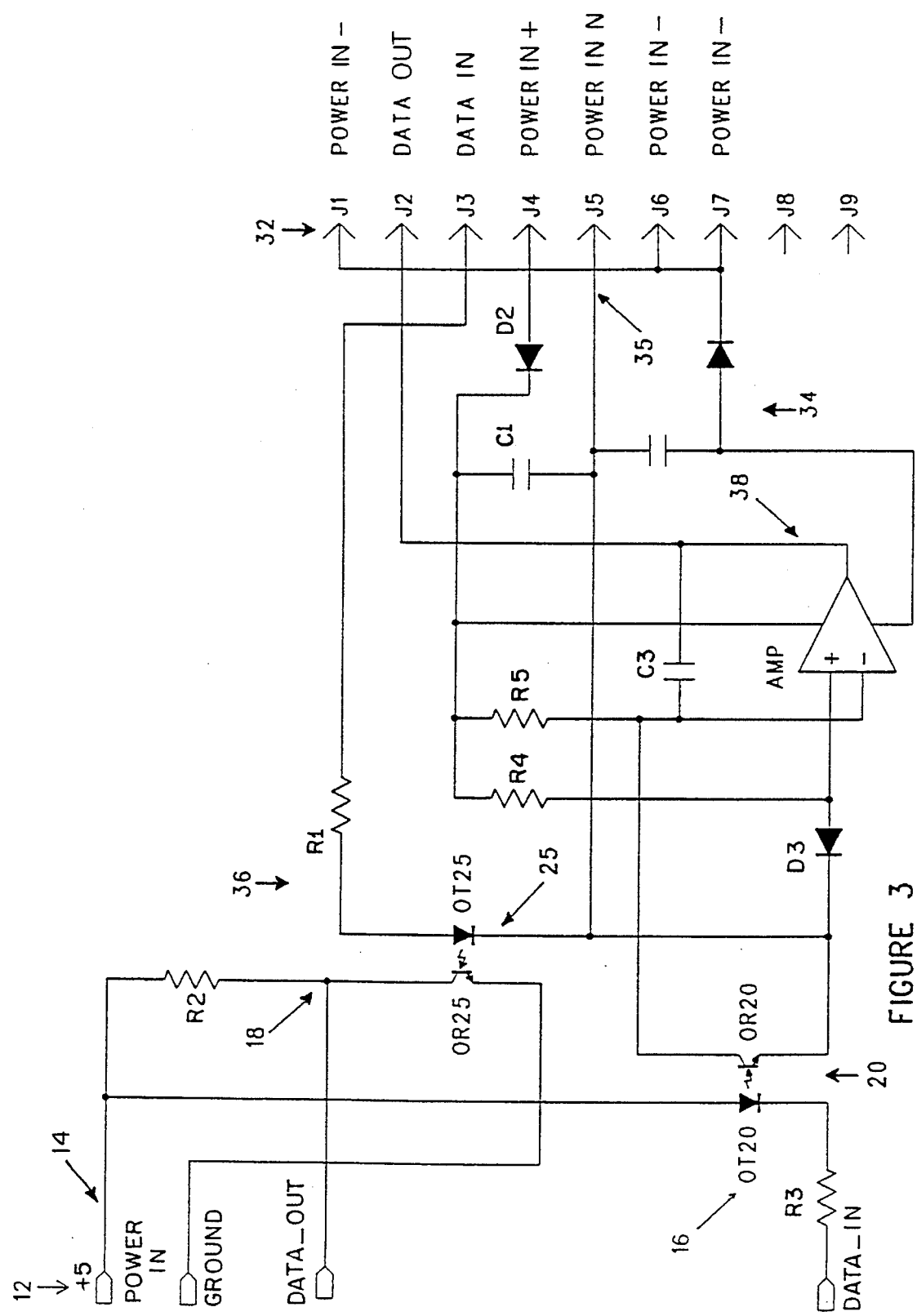
FIG. 3, is a schematic of an embodiment of an interface for connecting an RS-232 buss to a TTL buss.

A complete schematic of a preferred embodiment is shown in FIG. 3. The interface terminal 12 for the instrument includes a power in port having a +5 volts and ground connection which constitute the power source 14, a data out port and data in port. The interface terminal 32 to the computer includes a nine port terminal J1 through J9 which is typical of a RS-232 interface. The power in ports include a power in neutral port J5, with power in positive J4 and power in negative in any one of the ports J1, J6 or J7. The data in is on port J3 and the data out is on port J2. Ports J8 and J9 are not used. The examples of the +5 volts input from the instrument and ±10 volts from the computer are just an example of two different input power levels and define the level of input and output data signals. For example, FIG. 2 illustrates a timing diagram wherein the input signal is from the computer on, interface terminal 32 and the output signal is to the instrument on interface terminal 12.

The data in from computer on terminal J3 is provided to an optical transmitter OT 25 of optical isolator 25 through a ballast resistor R1 which constitutes the receiver 36. The other terminal of the optical transmitter OT 25 is connected to the neutral power in at J5. The optical receiver OR25 is connected between the +5 volts and ground input signals by pull-up resistor R2. The data output, which forms the transmitter 18, takes the data output from the junction of the resistor R2 and the optical receiver OR25. The optical isolator 25 and the value of resistor R1 is chosen so that the voltage and current levels present in the computer's RS-232 outputs are of sufficient magnitude to properly signal through the optical isolator 25. Resistor R2 is chosen for operation of the interface terminal 12 to the instrument. Since the data out port is connected to the 5 volts of power in port, the signal present at the data out port is in a range of 0 to +5 volts and will be directly compatible with TTL logic in the instrument which may include a micro controller.

The data in port from the instrument is provided through resistor R3, which constitutes the receiver 16, to an optical transmitter OT20 of the optical isolator 20. The other end of the optical transmitter OT20 is connected to the +5 voltage source. An optical receiver OR20 of the optical isolator 20 is connected between the power in neutral port 35 and an input to the transmitter 38, shown as an operational amplifier AMP. The output of the amplifier AMP is provided to the data out port J2.

The energy and power level for the computer side 32 of the interface 10 is acquired through diodes D1 and D2 to capacitors C1 and C2. Capacitor C1 stores a positive voltage from power positive port J4 and capacitor C2 stores a negative voltage from one of the negative power ports J1, J6, J7. The two diodes D1 and D2 are connected to unused signal outputs of the computer which is programmed to provide appropriate power levels for the power positive and power negative which is used to define the output signal levels to the computer. The diodes D1 and D2 prevents damage to the interface in the event that the connection were made before the proper signal levels were set by the computer.

A resistor R5 biases the output of the optical receiver OR20 at its common inverting input to the amplifier AMP. Resistor R4 and diode D3 bias a non-inverting input of amplifier AMP. The amplifier AMP converts the small signals present at the output from the optical receiver OR20 into a ±10 voltage signal at the interface level sufficient to drive the RS-232 receiver in the computer. A lead capacitor C3 is provided between the input and output of the operational amplifier AMP and OR20 input to improve the response of the amplifier AMP. Other forms of amplification may or may not require the lead capacitor C3.

While the above description contains many specificities, it will be apparent to one skilled in the art that the principles contained herein may be expanded and modified to accomplish a multitude of applications. It will also be apparent that this interface will simplify an electrically isolated serial interface to the point where its inclusion in a measuring instrument will not impose an undue price penalty on the instrument.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A bidirectional interface for interconnecting first and second devices each of which have their own power source, said first device including data input and data output ports and positive, negative and neutral ports and said second device including data input and data output ports and first and second power ports, said interface comprising:

first optical isolator including a) first input means for receiving data signals from said data output port of said first device at a first level and transmitting a first optical signal, and b) first output means for receiving said first optical signal and transmitting a first data signal to said data input port of said second device at a second level;

said first input means being connected to and powered by said first device's data output port and neutral port, and said first output means being connected to and powered by said second device's first and second power ports;

second optical isolator including a) second input means for receiving data signals from said data output port of said second device at said second level and transmitting a second optical signal, and b) second output means for receiving said second optical signal and transmitting a second data signal to said data input port of said first device at said first level; and said second input means being connected to and powered by said second device's data output port and first power port, and said second output means being connected to and powered by stored signals from said first device's positive and negative ports with respect to said neutral port.

2. An interface according to claim 1, wherein said first output means limits said first data signal by signals on said first and second power ports; and said second output means limits said second data signal by signals on said positive and negative ports.

3. An interface according to claim 2, wherein said second output means includes a capacitor connected between said positive port and said neutral port and a capacitor connected between said negative port and said neutral port for establishing said limits of said second output means.

4. An interface according to claim 1, wherein said positive and negative ports of said first device are signal ports and said first device provides continuous positive and negative signals of said first level at said positive and negative ports respectively.

5. An interface according to claim 1, wherein said first device is a computer, said interface is incorporated in said second device and said computer is connected to said interface by a cable.

6. An interface for interconnecting a computer having a terminal which includes at least data input, data output, positive, negative and neutral ports and a device having a terminal which includes at least data input, data output and first and second power ports, comprising:

a first terminal means to be connected to sad computer's terminal;

a second terminal means to be connected to said device's terminal;

first optical isolator means for transmitting a signal from said first terminal means at a first level to said second terminal means at a second level;

a second optical isolator means for transmitting a signal from said second terminal means at said second level to said first terminal means at said first level;

said first terminal means both powering a transmitter portion of said first optical isolator means and a receiver portion of said second optical isolator means and defining said first level storing said signals from said positive and negative ports of said computer with respect to said neutral port; and said second terminal means both powering a transmitter portion of said second optical isolator means and a receiver portion of said first optical isolator means and defining said second level using signals from said first and second power ports of said device.

7. An interface according to claim 6, including a cable for connecting said computer to said first terminal means of said interface; and wherein said interface is incorporated in said device and directly connects said device to said second terminal means of said interface.

8. Method of interfacing a computer having a terminal which includes at least data input, data output, first signal, second signal and neutral ports and a device having a terminal which includes at least data input, data output and first and second power ports, comprising the steps of:

programming said computer to provide a positive and a negative signal of a first level at said first and second signal ports of said computer's terminal;

providing an interface having a first terminal to be connected to said computer's terminal, a second terminal to be connected to said device's terminal, first optical isolator for transmitting a signal from said first terminal at said first level to said second terminal at a second level, and a second optical isolator for transmitting a signal from said second terminal at said second level to said first terminal at said first level;

connecting said computer's terminal to said first terminal of said interface for powering a transmitter portion of said first optical isolator and a receiver portion of said second optical isolator and for defining said first level by said positive and negative signals from said first and second signal ports of said computer with respect to said neutral port; and connecting said device's terminal to said second terminal of said interface for powering a transmitter portion of said second optical isolator and a receiver portion of said first optical isolator and for defining said second level using signals from said first and second power ports of said device.

9. A method according to claim 8, including connecting said computer to said first terminal of said interface using a cable and incorporating said interface in said device and directly connecting said device to said second terminal of said interface.

\* \* \* \* \*